United States Patent [19]

Sackmann et al.

[11] 4,151,336
[45] Apr. 24, 1979

[54] PROCESS FOR THE PRODUCTION OF A SUBSTANTIALLY EQUIMOLECULAR COPOLYMER OF MALEIC ACID ANHYDRIDE AND DIISOBUTYLENE

[75] Inventors: Günter Sackmann; Günter Kolb, both of Leverkusen; Heinz Fischer, Pulheim; Friedhelm Müller, Odenthal, all of Fed. Rep. of Germany

[73] Assignee: Bayer Aktiengesellschaft, Fed. Rep. of Germany

[21] Appl. No.: 869,043

[22] Filed: Jan. 13, 1978

[30] Foreign Application Priority Data

Jan. 18, 1977 [DE] Fed. Rep. of Germany ....... 2701760

[51] Int. Cl.² ........................... C08F 6/06; C08F 6/24; C08F 8/14; C08F 222/06
[52] U.S. Cl. ..................................... 526/15; 260/875; 526/86; 526/87; 526/272
[58] Field of Search ..................... 526/87, 86, 272, 15; 260/875

[56] References Cited

U.S. PATENT DOCUMENTS

| 2,725,367 | 11/1955 | Niederhauser | 526/272 |
| 2,930,775 | 3/1960 | Fordyce et al. | 526/272 |

*Primary Examiner*—John Kight, III
*Attorney, Agent, or Firm*—Connolly and Hutz

[57] ABSTRACT

An improved process for the production of a substantially equimolecular copolymer of maleic acid anhydride and diisobutylene in which from 10 to 100 mole % of the anhydride groups are esterified with linear or branched aliphatic monoalcohols containing from 1 to 20 carbon atoms or with cycloaliphatic monoalcohols containing from 5 to 6 carbon atoms to form the corresponding semiesters, wherein shortly before or after the end of the solution or suspension copolymerization of maleic acid anhydride and diisobutylene a monomer corresponding to the general formula

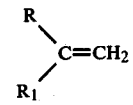

in which R=H, CH₃, C₂H₅, —OR₂, —O—CO—CH₃,

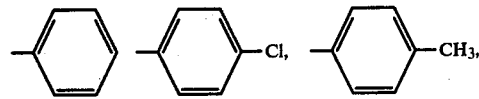

—CH₂OH, —CH₂O—C—CH₃,
R₁=H, CH₃ and
R₂=a linear or branched alkyl group containing from 1 to 4 carbon atoms, or mixtures of these monomers with one another are added to the polymerization mixture in quantities of from 1 to 12 mole %, based on the maleic acid anhydride used. The aqueous or aqueous-alcoholic alkali, amine or ammonium salt solutions of the semiesters of the copolymer are highly effective as anionic sizing agents for paper.

6 Claims, No Drawings

PROCESS FOR THE PRODUCTION OF A SUBSTANTIALLY EQUIMOLECULAR COPOLYMER OF MALEIC ACID ANHYDRIDE AND DIISOBUTYLENE

This invention relates to an improved process for the production of maleic acid anhydride-diisobutylene copolymers suitable for use as anionic sizing agents.

It is known from German Offenlegungsschrifts Nos. 2,361,544 and 2,501,123 that substantially alternate copolymers of maleic acid anhydride and diisobutylene can be used for the production of extremely effective sizing agents in the manufacture of paper. Thus, according to German Offenlegungsschrift No. 2,361,544 for example, these monomers are radically copolymerised in solvents for example, aromatic hydrocarbons, halogenated aromatic hydrocarbons, ketones, esters of lower fatty acids, chlorinated aliphatic hydrocarbons or strongly polar solvents. Also, it is disclosed in German Offenlegungsschrift No. 2,501,123 that the monomers may be copolymerised in suspension using excess diisobutylene as dispersion medium in the presence of from 0.5 to 10% by weight, based on the maleic acid anhydride used, of a special dispersant which is soluble in the dispersion medium.

Despite the use of a large molar excess of diisobutylene, the copolymerisation of these two monomers by the process described in the two above-mentioned German Offenlegungsschrifts does not result in complete incorporation of the maleic acid anhydride. When the maleic acid anhydride/diisobutylene copolymers are isolated in the form of water-moist powders having a solids content of more than 80% by weight, the unreacted maleic acid anhydride, as water-soluble maleic acid, pollutes the filtrate which enters the effluent system during filtration or centrifuging. On account of the high COD and BOD values (COD=chemical oxygen demand, BOD=biological oxygen demand) of this effluent due to the maleic acid dissolved therein, the outlay and hence costs involved in its purification increase.

The object of the present invention is to modify the copolymerisation of maleic acid anhydride and diisobutylene in solution and suspension in such a way that the maleic acid anhydride present in the monomer mixture is almost completely copolymerised.

According to the present invention, this object is achieved in that, initially, copolymerisation of the monomers, maleic acid anhydride and diisobutylene, is carried out radically in the usual way and then, shortly before or after the end of the polymerisation reaction, between 1 and 12 mole %, based on the maleic acid anhydride used, of a monomer corresponding to the general formula:

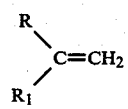

in which R=H, CH$_3$, C$_2$H$_5$, —OR$_2$,—O—CO—CH$_3$,

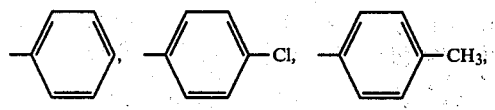

—CH$_2$—OH, —CH$_2$O—CO—CH$_3$,

R$_1$=H, CH$_3$ and,

R$_2$=a linear or branched chain alkyl group having 1 to 4 carbon atoms, or mixtures of two or more of these monomers are added to the polymerisation mixture.

Accordingly, the present invention provides an improved process for the production of a substantially equimolecular solution or suspension copolymer of maleic acid anhydride and diisobutylene, in which from 10 to 100 mole % of the anhydride groups are esterified with linear or branched aliphatic monoalcohols containing from 1 to 20 carbon atoms or with cycloaliphatic monoalcohols containing from 5 to 6 carbon atoms to form the corresponding semiesters, wherein, shortly before or after the end of the solution or suspension copolymerisation of maleic acid anhydride and diisobutylene, a monomer corresponding to the general formula:

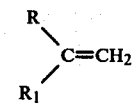

in which
R=H, CH$_3$, C$_2$H$_5$, —OR$_2$, —O—CO—CH$_3$,

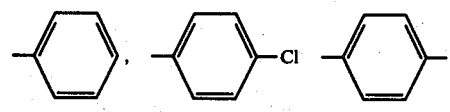

CH$_3$, —CH$_2$OH, —CH$_2$O—CO—CH$_3$
R$_1$=H, CH$_3$ and
R$_2$=a linear or branched chain alkyl group having from 1 to 4 carbon atoms,
or mixtures of these monomers with one another are added to the polymerisation mixture in quantities of from 1 to 12 mole %, based on the maleic acid anhydride used.

The process according to the invention yields copolymers in which the maleic acid anhydride is incorporated in a quantity of from 94.0 to 99.4 mole % and, in many cases, in quantities of more than 96.0 mole %, based on the maleic acid anhydride used. In addition, the paper sizing agents produced from these copolymers unexpectedly show a 10 to 25% better sizing effect than the paper sizing agents obtained in accordance with German Offenlegungsschrifts Nos. 2,361,544 and 2,501,123 both on weakly presized paper and also on unsized paper.

The third monomer or the monomeric mixtures are added at a point in time at which the polymerisation conversion, based on maleic acid anhydride, has reached a constant level. Shortly after the addition, the conversion of maleic acid anhydride increases again until it reaches a value of from 94 to 99.4 mole%, depending upon the polymerisation conditions and the monomer or monomeric mixture used. This monomer or the monomeric mixture may be added either individually or together with radical-forming substances at temperatures of from 30° C. to 200° C. The duration of the reaction of the polymerisation mixtures with the third monomer or the monomer mixtures amounts to between 1 and 10 hours.

Monomers suitable for reaction with the remaining maleic acid anhydride are monomers corresponding to the general formula:

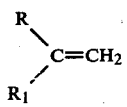

in which R=H, CH₃, C₂H₅, —OR₂, —O—CO—CH₃,

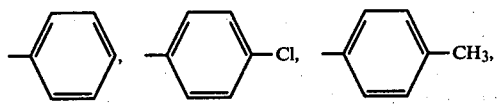

—CH₂OH, —CH₂O—CO—CH₃,
R₁=H, CH₃ and
R₂=a linear or branched chain alkyl group with 1 to 4 carbon atoms.

Examples of such monomers are ethylene, propylene, isobutylene, styrene, α-methyl styrene, p-methyl styrene, vinylacetate, allyl acetate, isobutyl vinyl ether, allyl alcohol and methallyl alcohol.

It is preferred to use the α-olefins corresponding to the above formula, especially styrene, α-methyl styrene and isobutylene.

If the third monomer or the monomeric mixtures are not added just before or after the end of the copolymerisation reaction, but instead at the beginning thereof, very little, if any, reduction is obtained in the content of unreacted maleic acid anhydride.

These monomers are used either individually or in admixtures with one another in quantities of from 1 to 12 mole %, based on maleic acid anhydride, but preferably in quantities of from 5 to 10 mole %.

The copolymerisation process is carried out in known manner up to addition of the other monomer or monomer mixture, as described for example in German Offenlegungsschrifts No. 2,361,544 and 2,501,123.

Non-copolymerised maleic acid anhydride may be determined in various ways according to the particular copolymerisation process used. Thus, where copolymerisation is carried out in solvents, such as toluene for example, the polymer solution is subjected to stripping with hot water under reduced pressure. By azeotropically distilling off the solvent, the copolymer is obtained in the form of a fine white powder suspended in water. After this powder has been filtered off and the filtrate concentrated by evaporation to dryness, hydrolysed maleic acid anhydride is left behind as residue in the form of free maleic acid. The quantity of maleic acid is determined gravimetrically after it has been identified by spectroscopy. The maleic acid present in the filtrate may also be determined by titration with 0.1 n NaOH-solution using phenolphthalein as indicator. If the copolymerisation reaction is carried out in suspension using excess diisobutylene as the dispersion medium, conversion is determined by weighing out the non-copolymerised maleic acid anhydride. The maleic acid anhydride insoluble in diisobutylene is isolated from the copolymer powder freed by filtration from diisobutylene in vacuo (0.2 mm Hg) at temperatures of from 80° C. to 120° C. The maleic acid anhydride sublimes out of the copolymer powder and is deposited as a solid product in a cold trap connected to the evacuation apparatus.

After they have been reacted with alcohols to form semiesters, the polymeric products obtained by the improved copolymerisation processes described above may be used with advantage in the form of their alkali, ammonium or amine salts as anionic paper-sizing agents.

Linear or branched aliphatic monoalcohols having from 1 to 20 carbon atoms and cycloaliphatic alcohols containing from 5 to 6 carbon atoms are suitable for preparing the semiesters. From 10 to 100 mole % of the anhydride groups present in the copolymers may be esterified to form the corresponding semiesters.

EXAMPLES 1-4

3.675 kg of maleic acid anhydride, 5.625 kg of diisobutylene and 5.100 kg of toluene were introduced into a 40 liter capacity steel autoclave. After the autoclave had been purged with nitrogen and closed, the temperature was increased while stirring to 75° C., followed by the rapid addition of 20% by weight of an initiator solution consisting of 0.0785 kg of azoisobutyrodinitrile in 1.350 kg of toluene. The rest of the initiator solution was added over a period of 2 hours. The mixture was stirred for 6 hours at 75° C., after which 0.039 kg of azoisobutyrodinitrile dissolved in 0.675 kg of toluene were added over a period of 30 minutes. The temperature was then increased to 85° C., the mixture was stirred for 6 hours, the temperature was then increased to 95° C. and the mixture stirred for another 6 hours. The following quantities of styrene were then quickly added together with 0.039 kg of azoisobutyrodinitrile dissolved in 0.675 kg of toluene:

| Example | 1 | 2 | 3 | 4 |
|---|---|---|---|---|
| Mole % of styrene (based on MAH[a] used) | 0 | 5.65 | 7.52 | 9.42 |

[a]MAH maleic acid anhydride

The mixture was then stirred for 2 hours at 95° C., after which the temperature was increased to 105° C. and the polymerisation mixtures kept at that temperature for 2 hours.

After the polymer solutions had cooled to 80° C., 0.5625 kg of isopropanol in 0.469 kg of toluene were added to them for conversion into the semiesters and the resulting solutions were stirred for 2 hours at 80° C. Thereafter the partially esterified copolymers were precipitated in the form of fine white powders by introducing the solutions into water heated to approximately 70° C. with simultaneous removal of the toluene and diisobutylene by azeotropic distillation. The polymer suspensions formed were stirred for 2 hours at 90° C./350-370 mm Hg.

They were then filtered off, the filtrates were concentrated by evaporation and the residues consisting of maleic acid were weighed out.
Results:

| Example | 1 | 2 | 3 | 4 |
|---|---|---|---|---|
| % by weight of maleic acid (based on MAH used) | 5.86 | 1.33 | 1.26 | 0.72 |

COMPARISON EXAMPLES 1A-4A

The following four Comparison Examples show that an immediate addition of the third monomer (in these Examples styrene) to the polymerisation mixture by comparison with Examples 1 to 4 results only in a slight reduction in the content of non-copolymerised maleic acid anhydride. The polymerisation reactions were carried out in the same way as described in Examples 1 to 4 with the sole difference that the styrene was present in the monomeric mixture before addition of the initiators.

| Example No. | Mole % of styrene (based on the MAH used) | % by weight of maleic acid (based on the MAH used) |
|---|---|---|
| 1A | 0.0 | 7.74 |
| 2A | 2.55 | 6.63 |
| 3A | 5.10 | 5.93 |
| 4A | 10.20 | 5.25 |

EXAMPLES 5–8

The following mixture was introduced into a 100 liter capacity steel autoclave:
 12.250 kg of maleic acid anhydride;
 41.000 kg of diisobutylene;
 2.130 kg of dispersant (copolymer of diisobutylene and maleic acid dodecyl semiester (produced in accordance with German Offenlegungschrift No. 2,501,133).

The autoclave was purged with nitrogen, the temperature was increased to 75° C. and the mixture stirred at 110 to 120 rpm. After the autoclave had been closed, a slight nitrogen excess pressure was applied and 25% by weight of a solution of 0.325 kg of t-butyl peroctoate in 2.500 kg of diisobutylene were added all at once. The internal temperature of the reaction vessel is then increased over a period of 1 hour to a level of 90° C., after which the remaining 75% by weight of the initiator solution were added over a period of 1 hour. On completion of the addition, the mixture was stirred for 6 hours at 90° C., after which the following quantities of styrene were introduced over a period of 1 hour together with a solution of 0.05 kg of t-butyl peroctoate dissolved in 0.460 kg of diisobutylene:

| Example No. | 5 | 6 | 7 | 8 |
|---|---|---|---|---|
| Mole % of styrene (based on the MAH used) | 0 | 3.26 | 6.52 | 9.80 |

The mixture was then stirred for 2 hours at 90° C., cooled to room temperature and filtered off.

The filtered polymer powders were subjected to a vacuum treatment for 28 hours at temperatures of from 30° C. to 120° C. and under pressures of from 12 mm Hg to 0.2 mm Hg. The maleic acid anhydride which sublimed out of the polymer powder during this treatment was deposited in the form of a solid crystalline substance (m.p. 55° C.) on the cooled surfaces of the sublimation apparatus. The maleic acid anhydride was collected, weighed and its quantity based on the maleic acid anhydride used for copolymerisation:

| Example No. | 5 | 6 | 7 | 8 |
|---|---|---|---|---|
| % by weight of maleic acid anhydride (based on the MAH used) | 7.65 | 5.74 | 1.41 | 0.56 |

The copolymers were converted into the semiesters by reaction with isopropanol by the same method as described in Examples 1 to 4.

COMPARISON EXAMPLES 5A to 8A

The following four Comparison Examples show that, by immediately adding the third monomer (in these Examples styrene) to the polymerisation mixture, only a slight reduction in the non-copolymerised maleic acid anhydride content by comparison with Examples 5 to 8 is also obtained in the suspension polymerisation process.

The polymerisation reactions were carried out in the same way as described in Examples 5 to 8 with the difference that the particular quantities of styrene added were present in the starting monomeric mixture before addition of the initiator.

| Example No. | Mole % of styrene (based on the MAH used) | % by weight of maleic acid anhydride (based on the MAH used) |
|---|---|---|
| 5A | 0.0 | 7.65 |
| 6A | 4.25 | 7.27 |
| 7A | 8.50 | 5.79 |
| 8A | 12.75 | 5.65 |

EXAMPLES 9 to 20

The following twelve Examples were carried out by the suspension process in accordance with Examples 5 to 8 using allyl alcohol, methallyl alcohol and isobutylene instead of styrene.

In this case, too, distinct reductions in the quantities of non-copolymerised maleic acid anhydride were obtained with increasing inputs of the monomers methallyl alcohol, allyl alcohol and isobutylene added at the end of the copolymerisations of maleic acid anhydride and diisobutylene by comparison with the copolymerisation reaction carried out in the absence of the third monomers.

| Example No. | Additional monomer | Mole % of additional monomer (based on MAH used) | % by weight of maleic acid anhydride (based on MAH used) |
|---|---|---|---|
| 9 | — | 0.0 | 7.54 |
| 10 | methallyl alcohol | 5.14 | 3.42 |
| 11 | " | 6.0 | 2.80 |
| 12 | " | 8.0 | 2.61 |
| 13 | " | 10.0 | 2.60 |
| 14 | allyl alcohol | 4.0 | 5.88 |
| 15 | " | 6.0 | 5.14 |
| 16 | " | 8.0 | 4.16 |
| 17 | " | 10.0 | 3.76 |
| 18 | isobutylene | 4.1 | 5.55 |
| 19 | " | 8.2 | 4.08 |
| 20 | " | 12.0 | 3.42 |

In order to produce the sizing agents, the copolymers may be converted into the semiesters by reaction with isopropanol in accordance with Examples 1 to 4.

PRACTICAL EXAMPLES

The following four Practical Examples demonstrate the suitability of the partially esterified copolymers described in Examples 1 to 8 for use as sizing agents for paper by comparison with a copolymer produced without the addition of a third monomer.

To this end, various raw papers were treated with the aqueous-ammoniacal solutions of these products in a type HF laboratory sizing press of the type manufactured by the Mathis Company of Zurich, Switzerland.

The sizing bath used for surface sizing consisted of a solution of 5% by weight of starch (Perfectamyl A 4692 (Trade Mark) a product of the AVEBE company) and 0.04 to 0.13% by weight of the sizing agent to be tested (expressed as 100% active substance) in 94.96 to 94.87% by weight of water.

The surface-sized papers were dried for 1 minute at about 100° C. on a drying cylinder. Before the sizing test, the papers were conditioned for 2 hours at room temperature.

The degree of sizing of the treated papers against ink was measured with a Hercules sizing tester in accordance with the operating instructions of the manufacturers, Hercules Inc., Wilmington, Delaware, USA. It is measured by recording the period of time in seconds which elapses before the remission value falls to 75% or 65% of the remission value of paper when the test ink is applied to the paper and breaks through the paper. The test ink used is the green test ink manufactured by the Hercules company. In order to determine water absorption, pieces of the treated papers were preweighed, immersed for 1 minute in water at 20° C., pressed once between filter paper under a 10 kg rolling weight and reweighed. The value for the water absorption on both sides was calculated in g/cm$^2$ from the weight difference. The lower the water absorption, the better the effect of the tested sizing agent.

The percentages quoted in the Tables relate to the proportion of sizing agent contained in the bath, expressed as 100% active substance.

PRACTICAL EXAMPLE 1

The sizing agent used in this case was produced from a copolymer according to Examples 1 to 8 with an addition of 4.60 mole% of styrene, based on maleic acid anhydride. This product was tested on a presized paper and on an unsized paper.

The unsized paper used, which contained 12% of talcum ash, was produced from bleached pulp to which alum had been added.

The presized paper used, which contained 7% of China clay ash, was produced from bleached pulp with an addition of approximately 0.1% of conventional rosin size (based on abietate) and alum.

The degree of sizing was measured with the Hercules sizing tester at a reduction in the remission values to 75%.

| a. unsized paper: | Degree of sizing according to Hercules in seconds for an addition to the bath of | |
|---|---|---|
| | 0.09% | 0.13% |
| | of sizing agent (100%) | |
| Sizing agent containing 4.60 mole % of styrene | 422 | 526 |
| Sizing agent free from styrene | 331 | 419 |
| b. presized paper: | Degree of sizing according to Hercules in seconds for an addition to the bath of | |
| | 0.09% | 0.13% |
| | of sizing agent (100%) | |
| Sizing agent containing 4.60 mole % of styrene | 236 | 440 |
| Sizing agent free from styrene | 112 | 219 |

The Examples show that the sizing agent according to the present invention containing 4.60 mole % of styrene, based on maleic acid anhydride, provides the tested papers with a distinctly higher degree of sizing than the comparison product.

PRACTICAL EXAMPLE 2

The sizing agent used in this case was produced from a copolymer according to Example 7 (6.52 moles of styrene). The degree of sizing was measured with the Hercules sizing tester at a reduction in the remission values to 65%.

An unsized paper of the type described in Practical Example 1a was used as the test paper:

| | Degree of sizing according to Hercules in seconds for an addition to the bath of | |
|---|---|---|
| | 0.09% | 0.13% |
| | of sizing agent (100%) | |
| Sizing agent containing 6.52 mole % of styrene | 108 | 203 |
| Sizing agent free from styrene | 30 | 128 |

This Example also reveals a distinct improvement in the sizing effect of the sizing agent according to the invention over the comparison product.

PRACTICAL EXAMPLE 3

The sizing agent used in this Example was produced from a copolymer according to Example 8 (9.80 mole % of styrene). This product was tested on an unsized alum-containing paper (Practical Example 3a) and on a paper weakly presized with resin size (Practical Example 3b).

In these Examples, the water absorption of the papers for different inputs was determined as a measure of the sizing effect of the tested products.

| a. unsized paper: | Water absorption in g/m$^2$ for additions to the bath of | | | |
|---|---|---|---|---|
| | 0.04% | 0.05% | 0.06% | 0.08 |
| | of sizing agent (100 %) | | | |
| Sizing agent containing 9.80 mole % of styrene | 35.5 | 34.1 | 33.2 | 30.7 |
| Sizing agent free from styrene | 39.1 | 38.0 | 35.9 | 32.8 |
| b. presized paper: | Water absorption in g/m$^2$ for additions to the bath of | | | |
| | 0.04% | 0.05% | 0.06% | 0.08 |
| | of sizing agent (100 %) | | | |
| Sizing agent containing 9.80 mole % of styrene | 54.0 | 52.1 | 47.6 | 40.3 |
| Sizing agent free from styrene | 58.1 | 54.3 | 50.1 | 44.6 |

The water-absorption values of the papers treated with the sizing agent according to the invention are also considerably better than those of the papers treated with the comparison product.

We claim:

1. A process for producing a substantially equimolecular copolymer of maleic acid anhydride and diisobutylene which comprises the steps of initiating solution or suspension copolymerization of maleic acid anhydride and diisobutylene and shortly before or after conclusion of said copolymerization introducing at least one additional monomer into the resulting polymerization mixture in an amount of from 1 to 12 mol %, based on the amount of maleic acid anhydride subjected to copolymerization, and maintaining resulting monomer containing polymerization mixture at a temperature of from 30° to 200° C. in the presence of a free radical initiator until the unreacted maleic acid anhydride content of said mixture has been reduced, said at least one monomer being of the formula

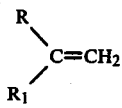

wherein R is hydrogen, —$CH_3$, —$C_2H_5$, —$OR_2$, —O—CO—$CH_3$,

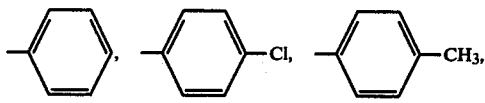

—$CH_2OH$ or —$CH_2O$—CO—$CH_3$; $R_1$ is hydrogen or —$CH_3$ and $R_2$ is alkyl having from 1 to 4 carbon atoms.

2. A process as claimed in claim 1, wherein the additional monomer is isobutylene, allyl alcohol, methallyl alcohol, styrene, α-methyl styrene, p-methyl styrene, vinylacetate, allyl acetate or isobutyl vinyl ether or a mixture thereof.

3. A process as claimed in claim 1, wherein the additional monomer is introduced at a temperature of from 30° C. to 200° C.

4. A process as claimed in claim 1, wherein the additional monomer is introduced together with a radical-forming substance.

5. A process as claimed in claim 1, wherein the additional monomer is introduced in a quantity of from 5 to 10 mole %.

6. A process as claimed in claim 1 wherein 10 to 100 mol % of the anhydride groups of said substantially equimolecular copolymer of maleic acid anhydride and diisobutylene is esterified with at least one aliphatic monoalcohol having from 1 to 20 carbon atoms or at least one cycloaliphatic monoalcohol having 5 to 6 carbon atoms to form the corresponding semiester.

* * * * *